United States Patent [19]

Fefeu

[11] Patent Number: 4,491,119
[45] Date of Patent: Jan. 1, 1985

[54] DIESEL OIL HEATER FOR DIESEL ENGINE

[75] Inventor: Michel Fefeu, Magny les Hameaux, France

[73] Assignees: Automobiles Citroen, Neuilly; Automobiles Peugeot, Paris, both of France

[21] Appl. No.: 494,805

[22] Filed: May 16, 1983

[30] Foreign Application Priority Data

May 17, 1982 [FR] France .................. 82 08872

[51] Int. Cl.³ .................................. F02M 31/00
[52] U.S. Cl. ........................ 123/557; 123/547; 123/514
[58] Field of Search ............ 123/557, 549, 547, 514, 123/516

[56] References Cited

U.S. PATENT DOCUMENTS

| | | | |
|---|---|---|---|
| 582,073 | 5/1897 | Mead | 123/557 |
| 640,083 | 12/1899 | Bickerton | 123/557 |
| 750,451 | 1/1904 | Grant | 123/557 |
| 1,124,157 | 1/1915 | Low | 123/557 |
| 1,129,605 | 2/1915 | Rounds | 123/557 |
| 1,597,060 | 8/1926 | Crussley | 123/557 |
| 2,617,633 | 11/1952 | Busch | 123/557 |
| 4,249,501 | 2/1981 | Ehresmann | 123/557 |
| 4,393,851 | 7/1983 | Gorans | 123/557 |
| 4,397,287 | 8/1983 | Pierard | 123/557 |

Primary Examiner—Ronald H. Lazarus
Attorney, Agent, or Firm—Karl F. Ross; Herbert Dubno

[57] ABSTRACT

This invention relates to an internal combustion engine cooled by water and provided with a Diesel oil heater, wherein the exchanger of the heater is fixed directly to the cylinder head of the engine, the two surfaces in contact being coupled to each other, and this cylinder head comprises, on its face on which the exchanger is applied, orifices which place it in communication with the space in the exchanger through which the water cooling the engine passes.

5 Claims, 7 Drawing Figures

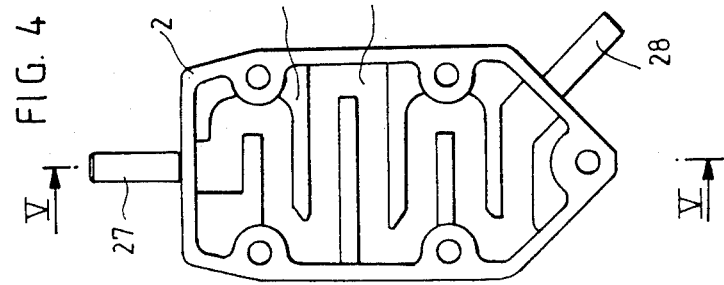
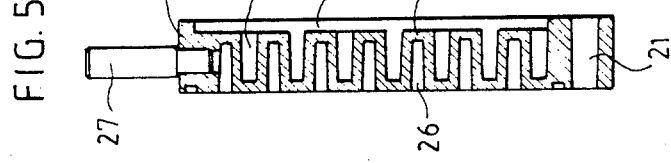
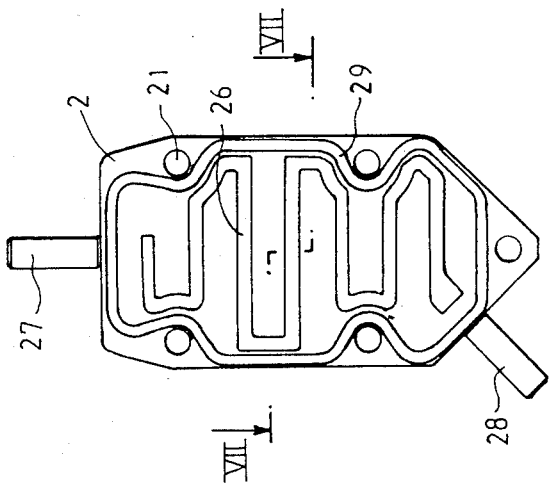
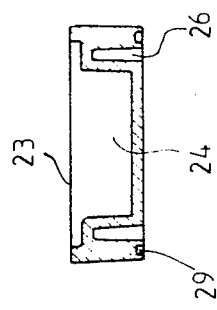

4,491,119

DIESEL OIL HEATER FOR DIESEL ENGINE

FIELD OF THE INVENTION

The present invention relates to a Diesel oil heater for a Diesel engine.

BACKGROUND OF THE INVENTION

Diesel engines are generally provided with an injection pump which takes Diesel oil from a tank and delivers it into injectors in the engine, after having passed it through a filter.

When the Diesel oil is at a temperature less than the temperature at the limit of filterability, which is, for example, at about −10° C., the Diesel oil deposits flakes which clog the filter. The engine can start when the temperature of the Diesel oil is between the filterability limit temperature and a flow limit temperature, which is, for example, −18° C., but operation is interrupted when the filter is clogged.

Various solutions have been proposed to ensure that the engine can be used when the temperature of the Diesel oil is between the two limit temperatures indicated above. In particular, it is known to provide a Diesel oil heater which employs the heat recovered by the water cooling the engine; the engine having started and heating up, the temperature of the Diesel oil rises and becomes higher than the filterability limit temperature, with the result that there is no deposit of flakes and any deposited flakes redissolve in the Diesel oil; any risk of clogging of the filter is avoided.

OBJECT OF THE INVENTION

It is an object of the invention to provide an internal combustion engine cooled by water and provided with a Diesel oil heater which is efficient and of particularly simple design.

SUMMARY OF THE INVENTION

The engine according to the invention is characterized in that the exchanger of the heater is fixed directly to the cylinder head of the engine, the two surfaces in contact being coupled to each other, and in that this cylinder head comprises, on its face on which the exchanger is applied, orifices which place it in communication with the space in the exchanger through which the water cooling the engine passes. This cooling water thus circulates directly from the cylinder head to the heater, without passing through intermediate conduits in which it might cool down.

In a particular embodiment of the invention, the exchanger comprises a thick plate of which the face adapted to be fixed to the cylinder head comprises a water circuit and of which the opposite face comprises the Diesel oil circuit, and a lid fixed on the plate and closing this Diesel oil circuit.

The Diesel oil circuit may be constituted by a continuous groove in coil form, whilst the water circuit is formed by a series of separate grooves connected to one another and disposed in quincunx with respect to the Diesel oil groove.

The heater may be associated with a heat regulator constituted by a three-way valve interposed in the Diesel oil circuit, upstream of the exchanger, and controlled by a heat-sensitive element so as to direct the Diesel oil coming from the tank either towards the exchanger or directly towards the filter, depending on the temperature thereof.

BRIEF DESCRIPTION OF THE DRAWING

The invention will be more readily understood on reading the following description with reference to the accompanying drawing, in which:

FIG. 4 is a view in elevation of the body of the exchanger on the Diesel oil circuit side.

FIG. 5 is a section thereof along V—V of FIG. 4.

FIG. 6 is a view in elevation of the body of the exchanger on the water circuit side.

FIG. 7 is a section thereof along VII—VII of FIG. 6.

SPECIFIC DESCRIPTION

Figure 1:
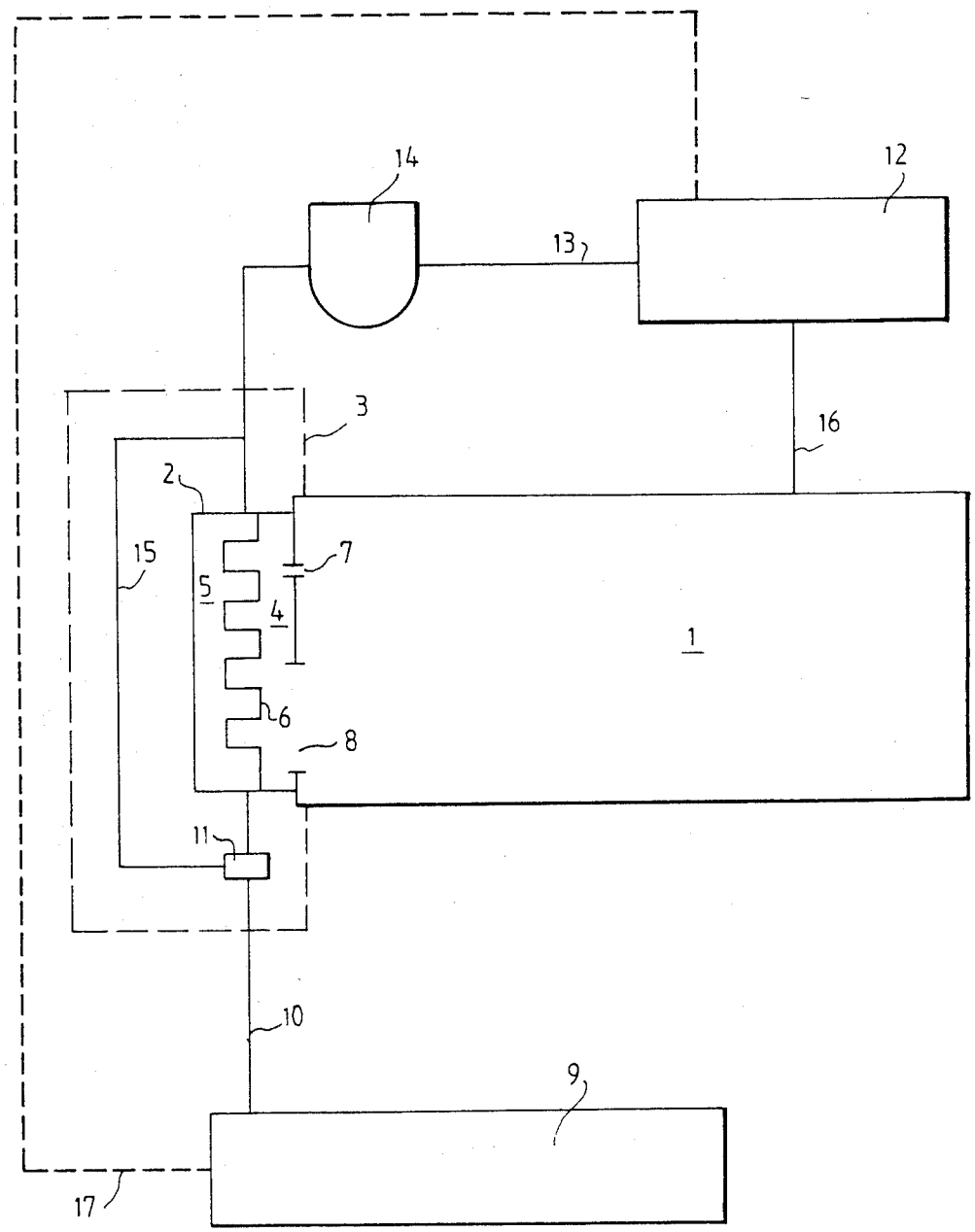
FIG. 1 is a diagram showing the cylinder head of the engine and the Diesel oil heating installation.
Figure 2:
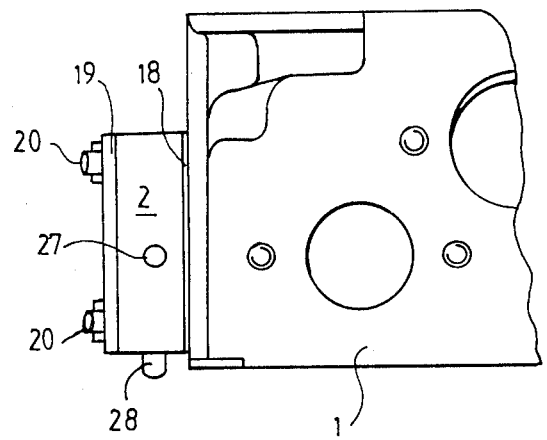
FIG. 2 is a plan view showing the exchanger of the heater fixed to the cylinder head of the engine.

Referring now to the drawings, FIG. 1 shows the cylinder head 1 of an internal combustion engine, on which is fixed the exchanger 2 of a heater 3, which is divided into two chambers 4 and 5 by a wall 6. The chamber 4 communicates with the cylinder head through orifices 7 and 8 which allow the water cooling this cylinder head to circulate in the chamber 4.

The chamber 5 of the exchanger 2 is connected, on the one hand, to a Diesel oil tank 9 by a duct 10 in which a regulator 11 is interposed, and, on the other hand, to a pump 12 by a duct 13 in which a filter 14 is interposed. The regulator 11 is constituted by a three-way valve controlled by a heat-sensitive element, constituted for example by a capsule of wax and which, when the temperature of the Diesel oil reaches a certain value, connects the tank 9 to the filter 14 via a duct 15, short-circuiting the chamber 5 of the exchanger 2. The pump 12 is furthermore connected to the injectors of the engine by a duct 16 and to the tank 9 by a duct 17 enabling the excess Diesel oil to be returned to this tank.

When the temperature of the Diesel oil is low, the Diesel oil coming from the tank 9 passes through the exchanger 2, in which it is heated by the engine cooling water, then the filter 14 and reaches the pump 12 which sends it to the injectors of the engine, the excess returning to the tank via duct 17.

Figure 3:
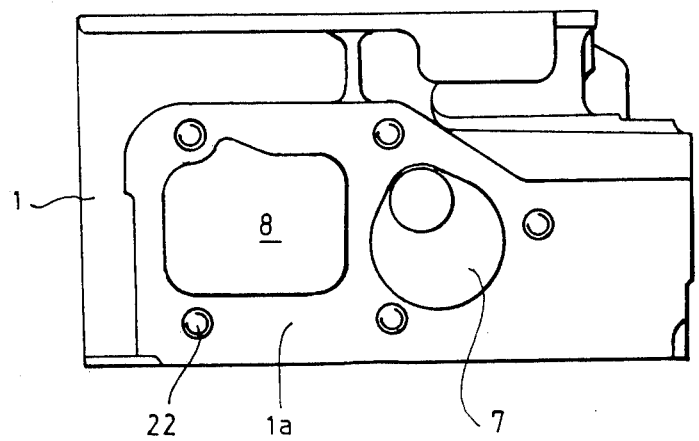
FIG. 3 is a side elevational view of the cylinder head and shows the face thereof on which the exchanger is connected.

The exchanger 2 is directly connected on one of the side faces 1a of the cylinder head 1, with interposition of a flat gasket 18, and is closed by a lid 19, the whole being fixed by pins 20 which pass through holes 21 in the exchanger and are screwed in tapped holes 22 in the cylinder head (cf. FIGS. 3 and 6.)

The exchanger 2 is constituted by a thick plate on one of the faces of which a space 23 forming a water chamber has been formed, into which open out grooves 24 is disposed in quincunx and separated from one another by a continuous boss 25 in coil form. This face is in contact with the gasket 18.

On its opposite face, the exchanger 2 comprises a groove 26 formed in the boss 25. This groove which is continuous and constitutes the chamber 5, communicates with two connectors 27 and 28 adapted to be connected to ducts 10 and 13 respectively. The exchanger also comprises a peripheral groove 29 adapted to receive an O-ring ensuring a seal between the body of the exchanger and the lid 19.

What is claimed is:

1. A Diesel engine comprising:
   a cylinder block having a cylinder head formed directly with an orifice and a pair of orifices opening at said surface and defining a portion of a cooling water path for said head and the engine;
   a Diesel oil heater comprising a heat-exchanger path formed with a passage and with fittings communicating with said passage for passing Diesel oil fueling said engine through said body, a water compartment in heat-exchanging relationship with said passage and a surface having at least one window communicating with said compartment; and
   means for securing said body to said head with said surface of said body in direct contact with said surface on said head whereby cooling water circulating through said head is circulated through said compartment of said body to heat Diesel oil traversing said passage.

2. The Diesel engine defined in claim 1 wherein said body is a thick plate bolted directly to said head and formed with a groove defining said passage and opening at a face of said plate opposite said surface of said body, said heater further comprising a cover affixed to said plate to close said groove.

3. The Diesel engine defined in claim 2 wherein said groove has an undulating configuration and said compartment includes grooves extending into undulations of the groove forming said passage.

4. A Diesel engine comprising:
   a cylinder block having a cylinder head formed directly with an orifice and a pair of orifices opening at said surface and defining a portion of a cooling water path for said head and the engine;
   a Diesel oil heater comprising a heat-exchanger path formed with a passage and with fittings communicating with said passage for passing Diesel oil fueling said engine through said body, a water compartment in heat-exchanging relationship with said passage and a surface having at least one window communicating with said compartment;
   means for securing said body to said head with said surface of said body in direct contact with said surface on said head whereby cooling water circulating through said head is circulated through said compartment of said body to heat Diesel oil traversing said passage; and
   a heat regulator constituted by a three-way valve connected to said passage upstream thereof and provided with a heat-sensitive element for selectively directing Diesel oil through said passage or through a bypass depending upon the temperature of said oil.

5. A Diesel engine comprising:
   a cylinder block having a cylinder head formed directly with an orifice and a pair of orifices opening at said surface and defining a portion of a cooling water path for said head and the engine;
   a Diesel oil heater comprising a heat-exchanger path formed with a passage and with fittings communicating with said passage for passing Diesel oil fueling said engine through said body, a water compartment in heat-exchanging relationship with said passage and a surface having at least one window communicating with said compartment;
   means for securing said body to said head with said surface of said body in direct contact with said surface on said head whereby cooling water circulating through said head is circulated through said compartment of said body to heat Diesel oil traversing said passage, said body having the configuration of a plate machined on one side thereof to form said compartment and provided with a continuous undulating groove open on an opposite side of said plate, said heater further comprising a cover closing said groove on said opposite side of said plate, said compartment being provided with further grooves reaching between undulations of the groove forming said passage; and
   a heat regulator constituted by a three-way valve connected to said passage upstream thereof and provided with a heat-sensitive element for selectively directing Diesel oil through said passage or through a bypass depending upon the temperature of said oil.

* * * * *